(12) United States Patent
Cai

(10) Patent No.: US 12,201,237 B2
(45) Date of Patent: Jan. 21, 2025

(54) SEALING COVER FOR GASTRONORM PANS

(71) Applicant: Zhongshan Jiabao Daily Products Co., Ltd, Zhongshan (CN)

(72) Inventor: Shengbin Cai, Zhongshan (CN)

(73) Assignee: Zhongshan Jiabao Daily Products Co., Ltd, Zhongshan (CN)

( * ) Notice: Subject to any disclaimer, the term of this patent is extended or adjusted under 35 U.S.C. 154(b) by 0 days.

(21) Appl. No.: 18/774,367

(22) Filed: Jul. 16, 2024

(65) Prior Publication Data

US 2024/0366025 A1 Nov. 7, 2024

(30) Foreign Application Priority Data

Nov. 30, 2023 (CN) .......................... 202323258790.7

(51) Int. Cl.
*A47J 36/10* (2006.01)

(52) U.S. Cl.
CPC ..................................... *A47J 36/10* (2013.01)

(58) Field of Classification Search
CPC .............................. A47J 36/10; B65D 43/021
USPC ..... 220/573.1, 805, 802, 801, 798, 784, 800
See application file for complete search history.

(56) References Cited

U.S. PATENT DOCUMENTS

| | | | | |
|---|---|---|---|---|
| 4,180,179 A | * | 12/1979 | Hoenig | B65D 43/0206 220/784 |
| 4,444,332 A | * | 4/1984 | Widen | B65D 43/0212 220/792 |
| 6,799,692 B2 | * | 10/2004 | Teixeira Alvares | B65D 43/0252 220/756 |

FOREIGN PATENT DOCUMENTS

| | | |
|---|---|---|
| CN | 202582629 U | 12/2012 |
| CN | 106813496 A | 6/2017 |
| CN | 108082715 A | 5/2018 |

* cited by examiner

*Primary Examiner* — Andrew D Perreault
(74) *Attorney, Agent, or Firm* — Jeenam Park

(57) ABSTRACT

A sealing cover for GN pans, including a pan cover body and a sealing ring that is arranged on the pan cover body; surrounding edges of the pan cover body extend outward to form a pan edge, which is provided with a first clamping groove, and a second clamping groove is arranged at the pan cover body, an outer wall of the sealing ring extends outward to form a first clamping edge, and an inner wall extends inward to form a second clamping edge, the first and second clamping edge are respectively embedded in the first and second clamping groove. Thus, the sealing ring is ensured to be tightly connected with the pan cover body, and relative movement between the sealing ring and the pan cover body is avoided, forming an integrated structure of the sealing ring and the pan cover body and to ensure the sealing performance.

11 Claims, 15 Drawing Sheets

SEALING COVER FOR GASTRONORM PANS

CROSS-REFERENCE TO RELATED APPLICATIONS

The application claims priority to Chinese patent application No. 202323258790.7, filed on Nov. 30, 2023, the entire contents of which are incorporated herein by reference.

TECHNICAL FIELD

The present disclosure relates to the technical field of sealing covers, and in particular to a sealing cover for GN pans (gastronorm pans).

BACKGROUND

Due to the not tight connection between sealing covers and pan cover bodies, existing sealing rings usually shift from the pan cover body or even fall off, resulting in a loose seal when sealing covers seal GN pans.

SUMMARY

The present disclosure solves one of the problems existing in the background to a certain extent. To this end, one purpose of the present disclosure is to propose a sealing cover for GN pans, which ensures that the sealing ring is tightly connected to the pan cover body, avoids relative movement between the sealing ring and the pan cover body, and forms an integrated structure of the sealing ring and the pan cover body.

The above purpose is achieved through the following technical solutions.

A sealing cover for GN pans, including a pan cover body and a sealing ring, wherein the sealing ring is arranged on the pan cover body, and surrounding edges of the pan cover body extend outward to form a pan edge; a first clamping groove is arranged at the pan edge, and a second clamping groove is arranged at the pan cover body, an outer wall of the sealing ring extends outward to form a first clamping edge, and an inner wall of the sealing ring extends inward to form a second clamping edge; the first clamping edge is embedded in the first clamping groove, and the second clamping edge is embedded in the second clamping groove, so as to limit the movement of the sealing ring on the pan cover body.

As a further improvement of the present disclosure, the sealing ring includes an upper ring body, a top of an outer wall of the upper ring body extends outward to form the first clamping edge, and a bottom of an inner wall of the upper ring body extends inward to form the second clamping edge.

As a further improvement of the present disclosure, an embedding groove is arranged at the inner wall of the upper ring body, and a protruding block is arranged on an outer wall of the pan cover body, and the protruding block is arranged in cooperation with the embedding groove.

As a further improvement of the present disclosure, the embedding groove is evenly arranged at circumferential intervals on the inner wall of the upper ring body.

As a further improvement of the present disclosure, the width of the embedding groove gradually increases from an end close to the pan cover body to the other end away from the pan cover body, and/or the width of the embedding groove gradually increases from bottom to top.

As a further improvement of the present disclosure, first mounting blocks protrude from the first clamping edge, and first mounting grooves are arranged at a depression of the first clamping groove, and the first mounting block is engaged with the first mounting groove; second mounting block protrude from the second clamping edge, and second mounting grooves are arranged at a depression of the second clamping groove, and the second mounting block is engaged with the second mounting groove.

As a further improvement of the present disclosure, an air pressure balance hole is provided at the pan cover body, and further includes a sealing nozzle. The sealing nozzle and the sealing ring are an integrated structure, and the sealing nozzle is used to open or close the air pressure balance hole.

As a further improvement of the present disclosure, a perforation is provided on the pan cover body; an end of the sealing nozzle is connected to the sealing ring, and the other end passes through the perforation and extends toward the air pressure balance hole.

As a further improvement of the present disclosure, a lower ring body is also included, which is formed by extending downward from a lower end of the upper ring body.

As a further improvement of the present disclosure, a plurality of horizontal strips are provided on the outer wall of the sealing ring, and the horizontal strips are evenly arranged in a vertical direction.

Compared with the prior art, the present disclosure has at least the following beneficial effects.

1. The present disclosure provides a sealing cover for GN pans, wherein the first clamping edge is embedded in the first clamping groove, and the second clamping edge is embedded in the second clamping groove, so as to limit the movement of the sealing ring from the pan cover body. The sealing ring is ensured to be tightly connected with the pan cover body, and relative movement between the sealing ring and the pan cover body is avoid, so as to form an integrated structure of the sealing ring and the pan cover body, and to ensure the sealing performance.

DETAILED DESCRIPTION OF THE EMBODIMENTS

The following embodiments illustrate the present disclosure, but the present disclosure is not limited by these embodiments. Modifications to the specific embodiment of the present disclosure or equivalent replacement of some technical features without departing from the spirit of the present disclosure should be included in the scope of the technical solution for which protection is requested in the present disclosure.

Figure 1:
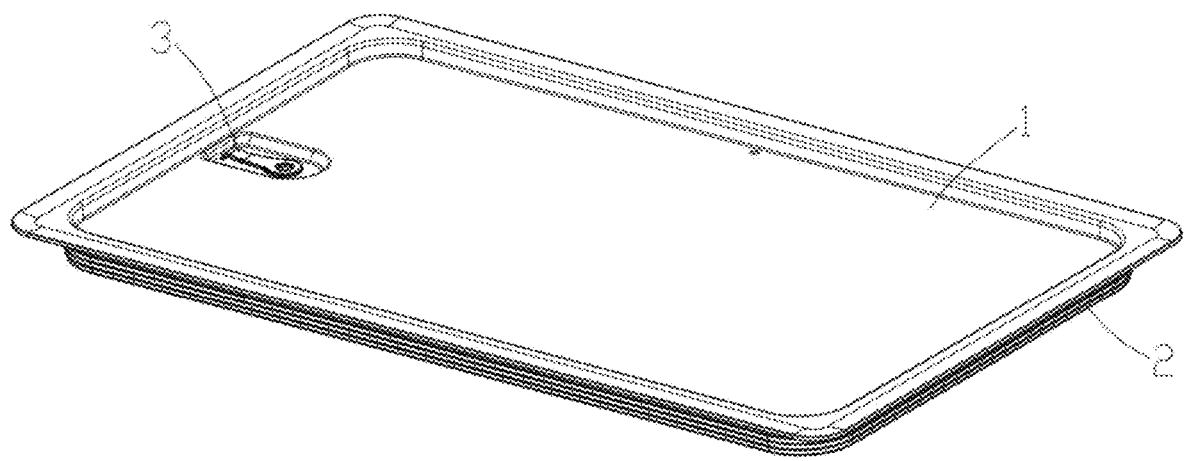
FIG. 1 is a structural schematic diagram of a sealing cover for GN pans in the embodiment.
Figure 2:
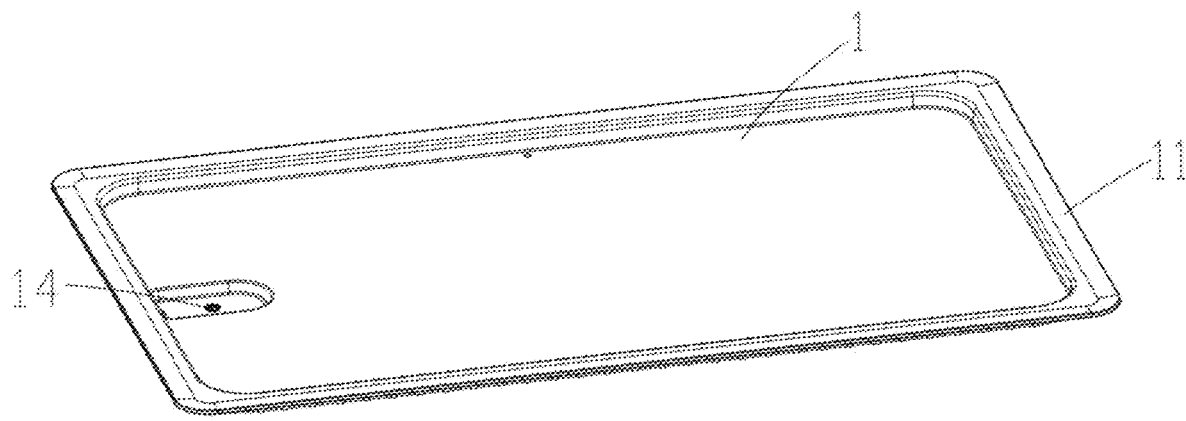
FIG. 2 is a structural schematic diagram of a pan cover body in the embodiment.
Figure 3:
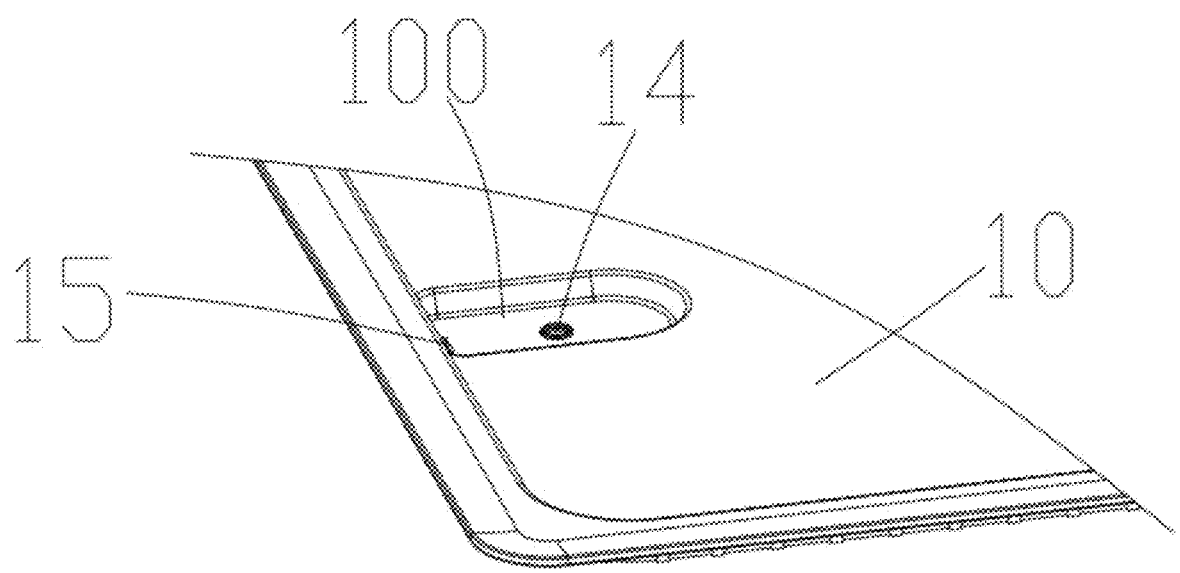
FIG. 3 is a partial schematic diagram of the pan cover body in the embodiment.
Figure 4:
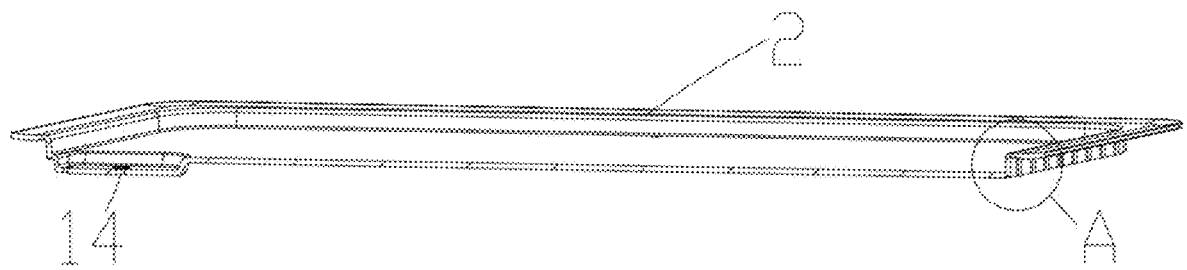
FIG. 4 is a cross-sectional view of the pan cover body in the embodiment.
Figure 5:
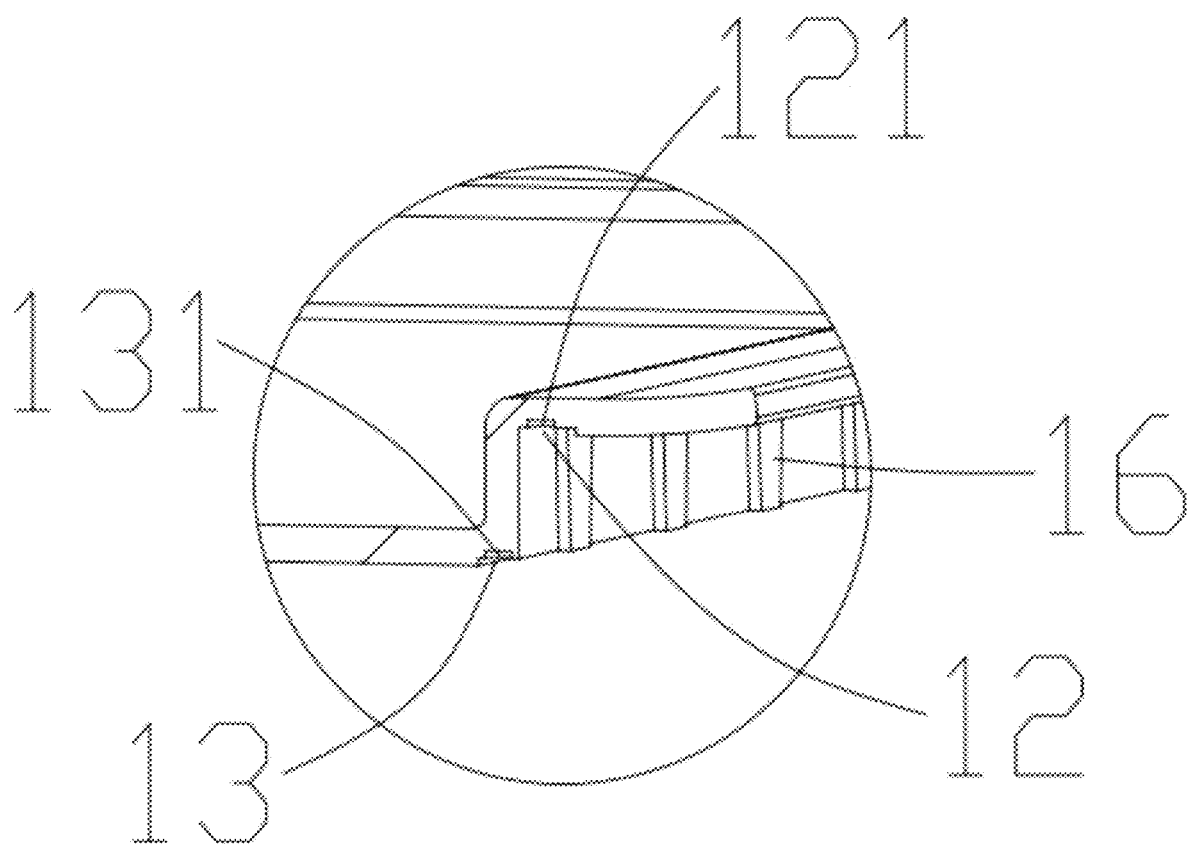
FIG. 5 is an enlarged view of part A in FIG. 4.
Figure 6:
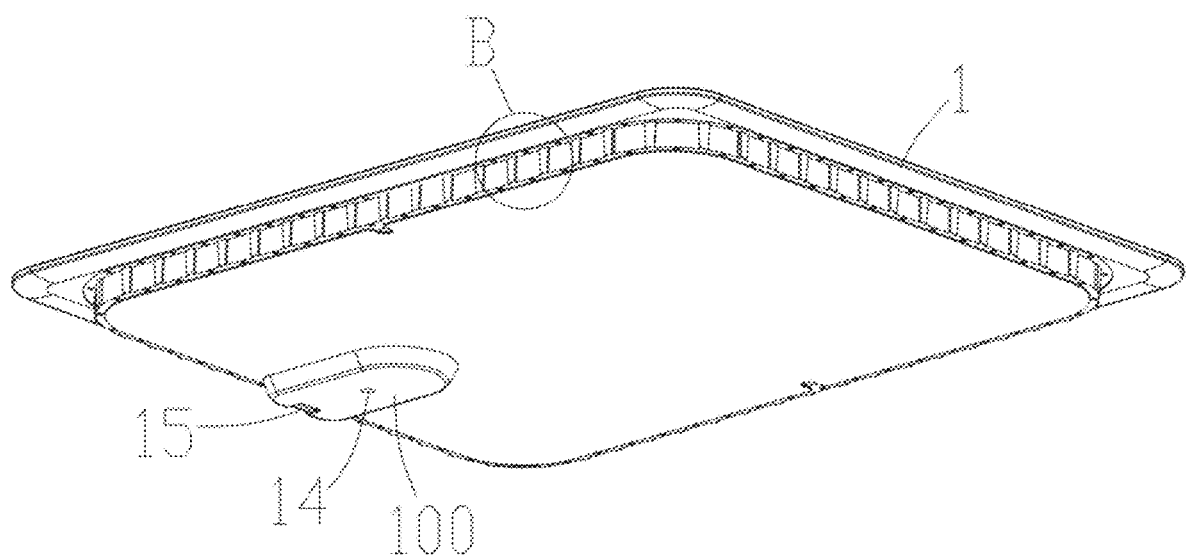
FIG. 6 is another structural schematic diagram of the pan cover body in the embodiment.
Figure 7:
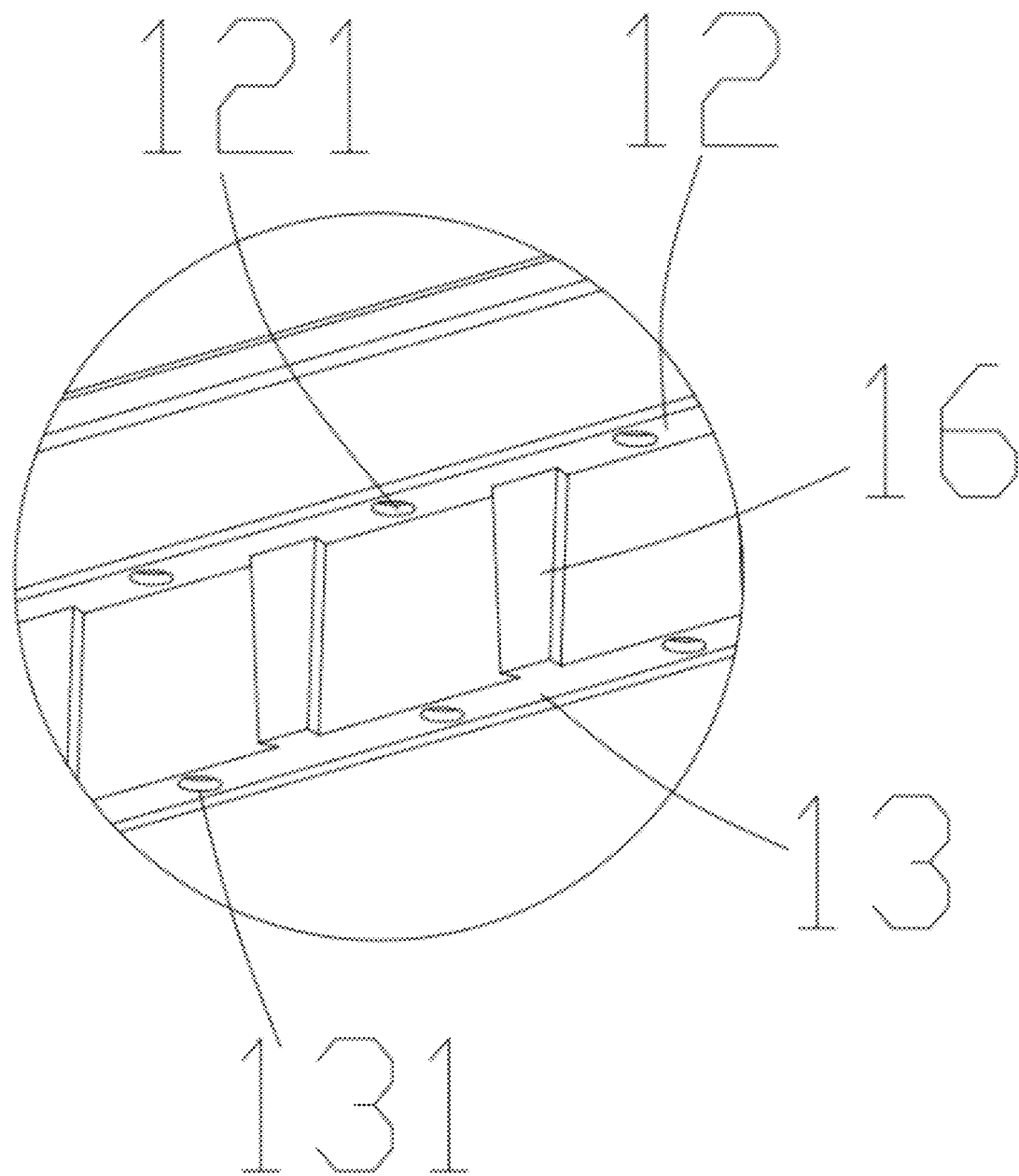
FIG. 7 is an enlarged view of part B in FIG. 6.
Figure 8:
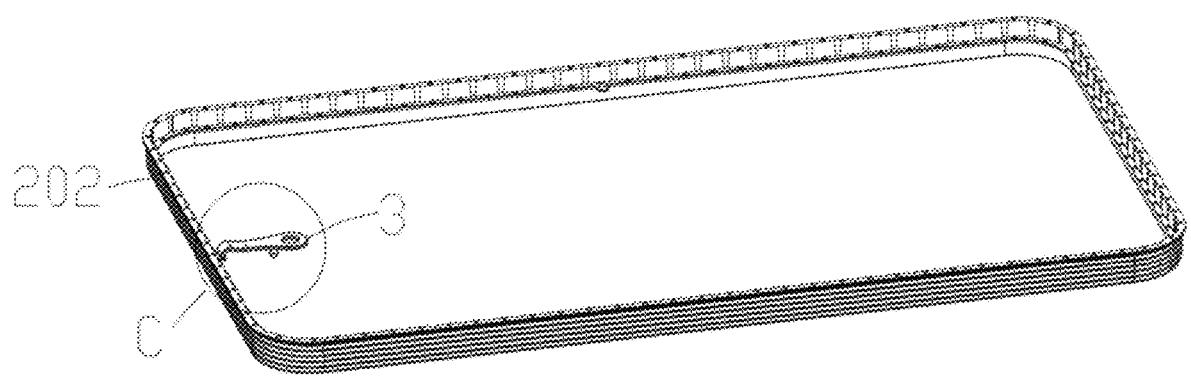
FIG. 8 is a structural schematic diagram of a sealing ring in the embodiment.
Figure 9:
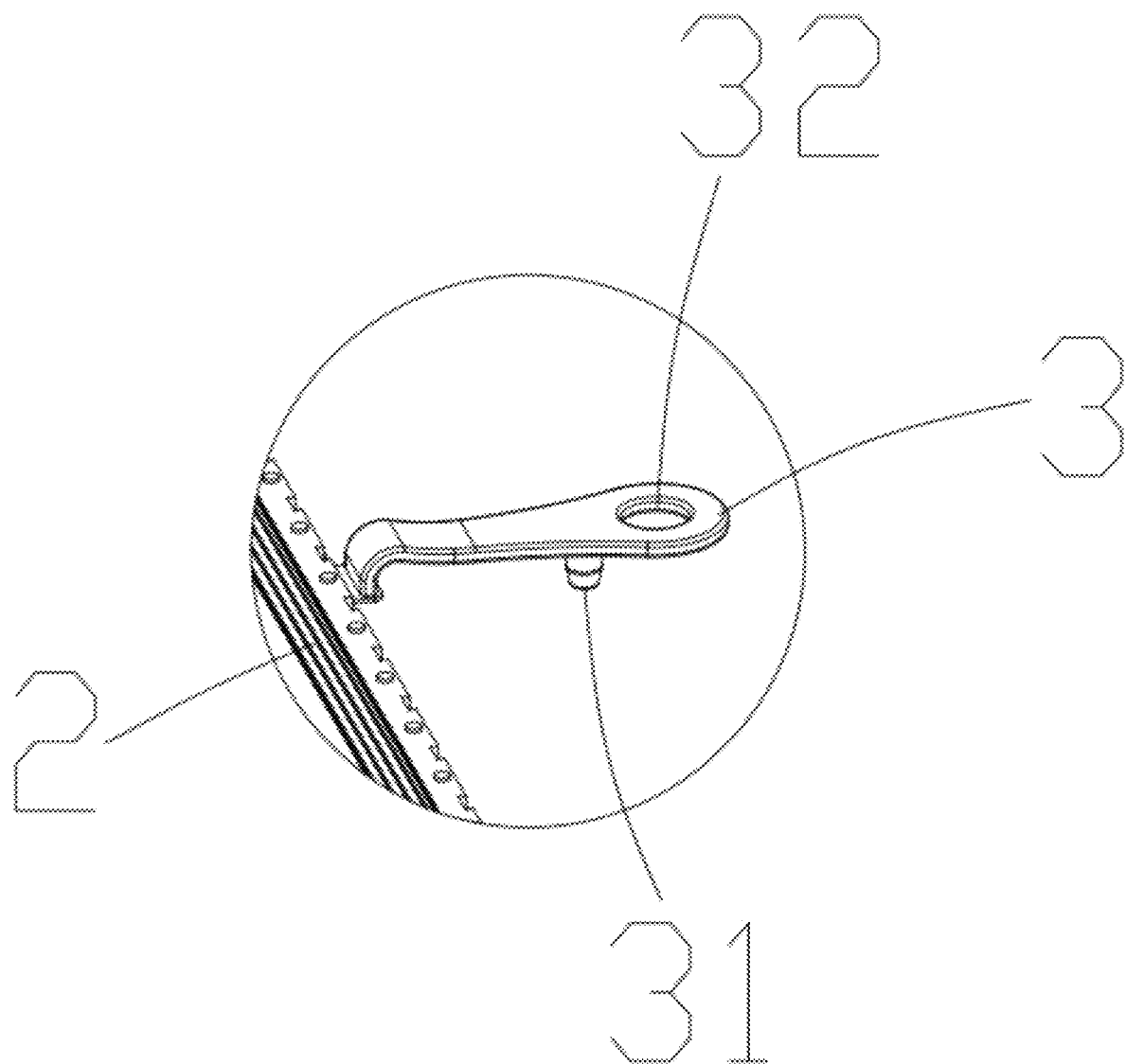
FIG. 9 is an enlarged view of part C in FIG. 8.
Figure 10:
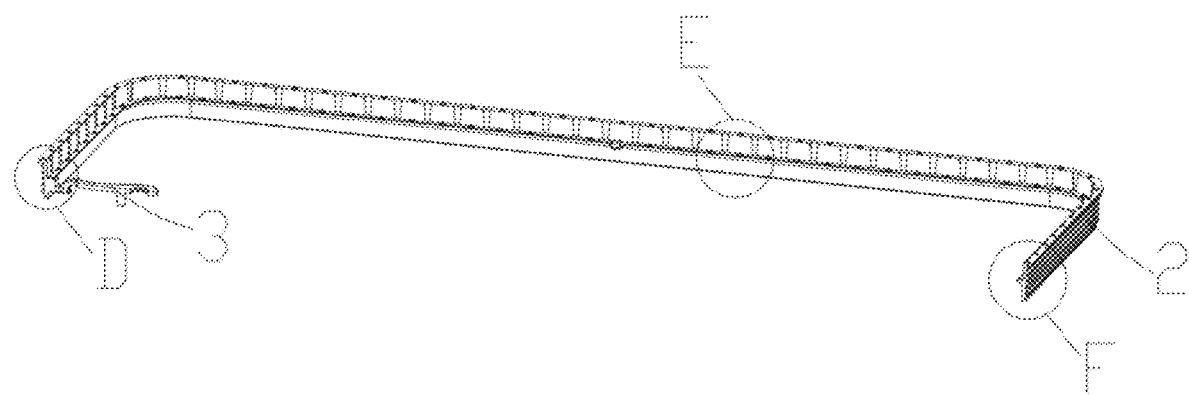
FIG. 10 is a cross-sectional view of the sealing ring in the embodiment.
Figure 11:
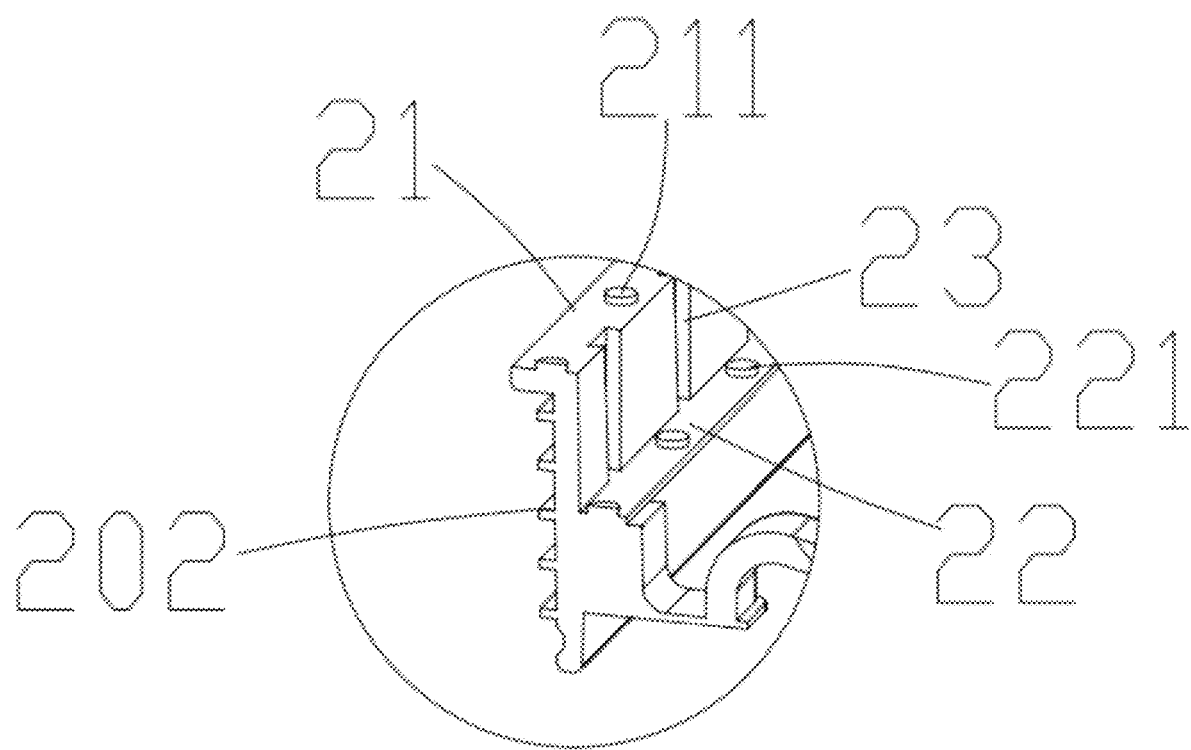
FIG. 11 is an enlarged view of part D in FIG. 10.
Figure 12:
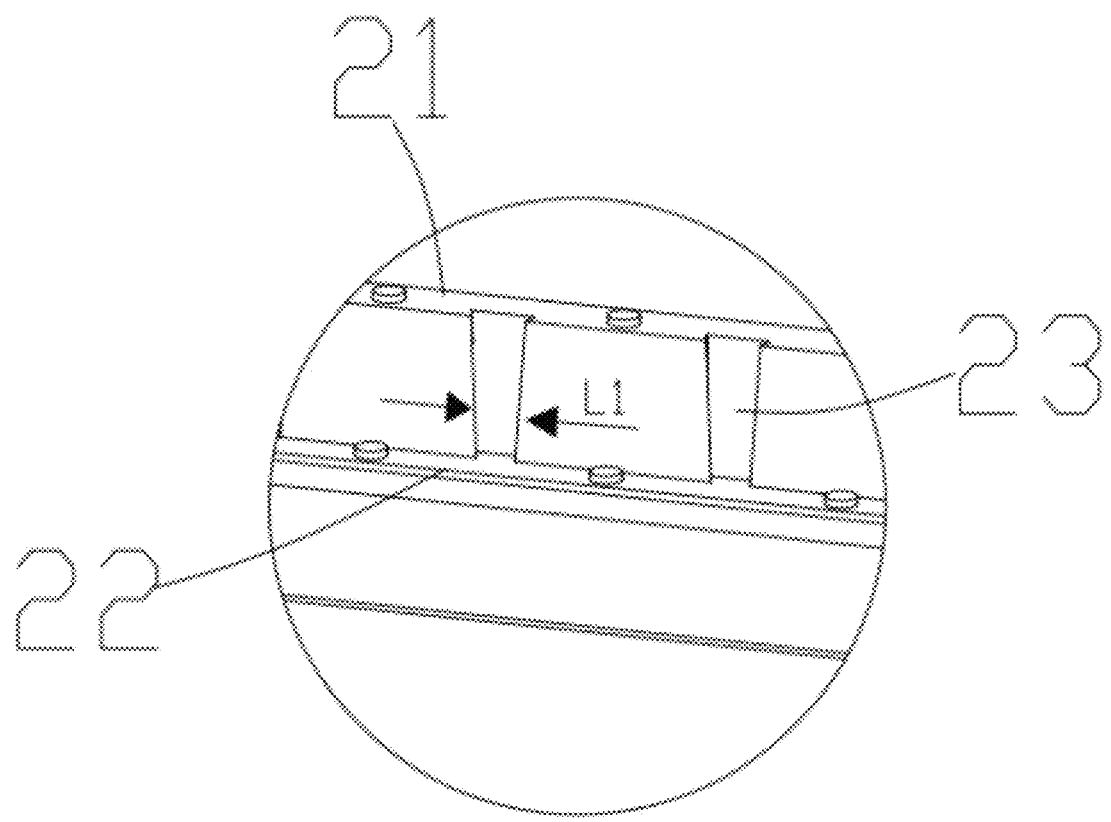
FIG. 12 is an enlarged view of part E in FIG. 10.
Figure 13:
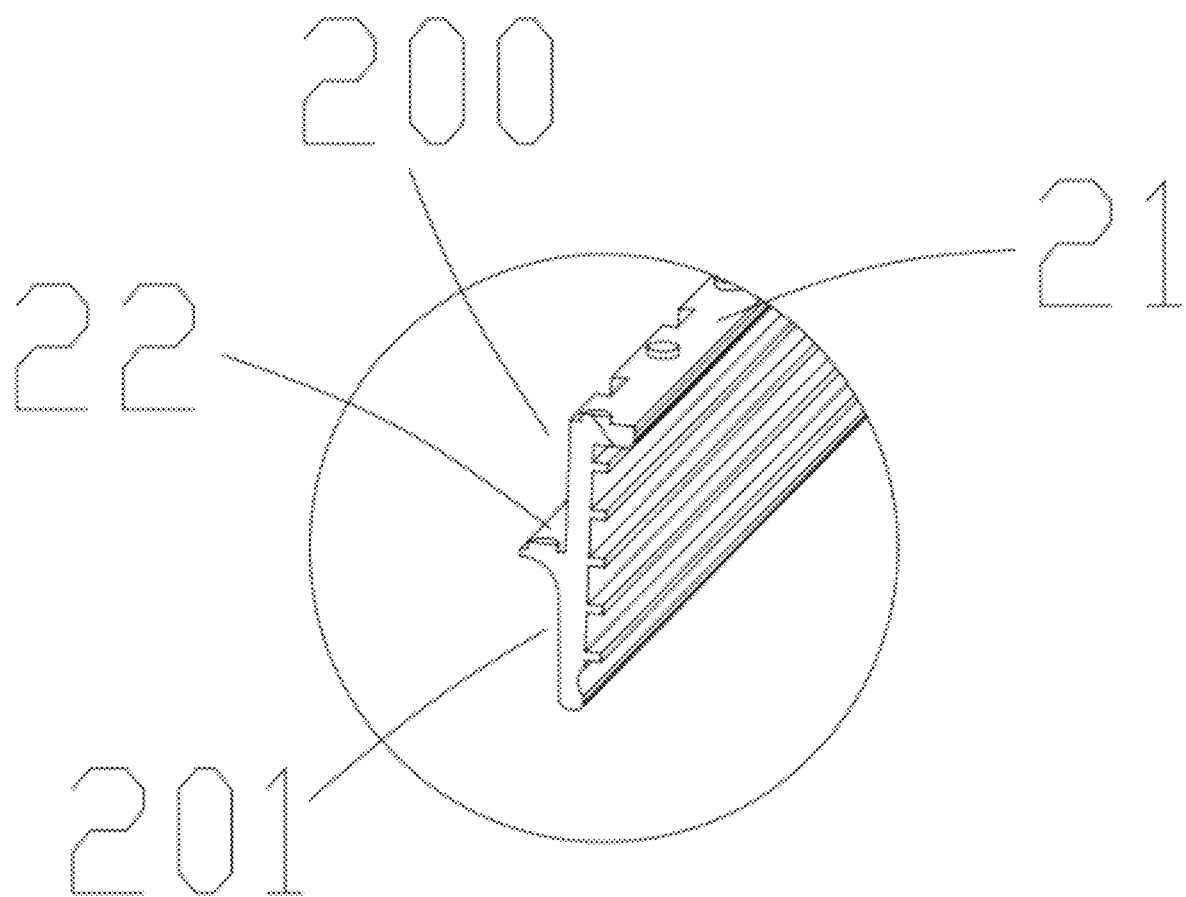
FIG. 13 is an enlarged view of part F in FIG. 10.
Figure 14:
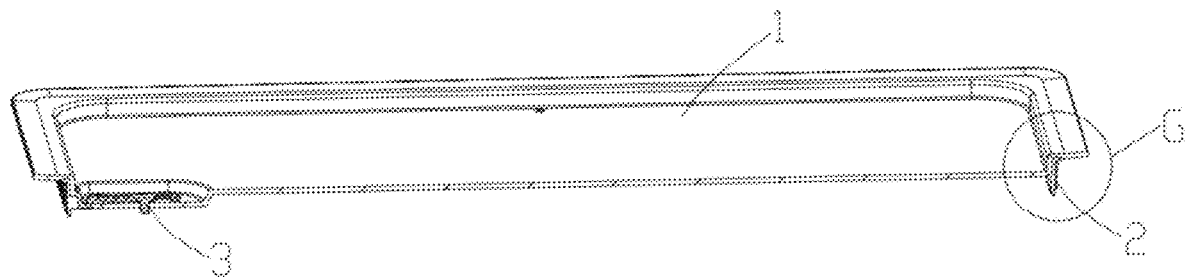
FIG. 14 is a cross-sectional view of the sealing cover for GN pans in the embodiment.
Figure 15:
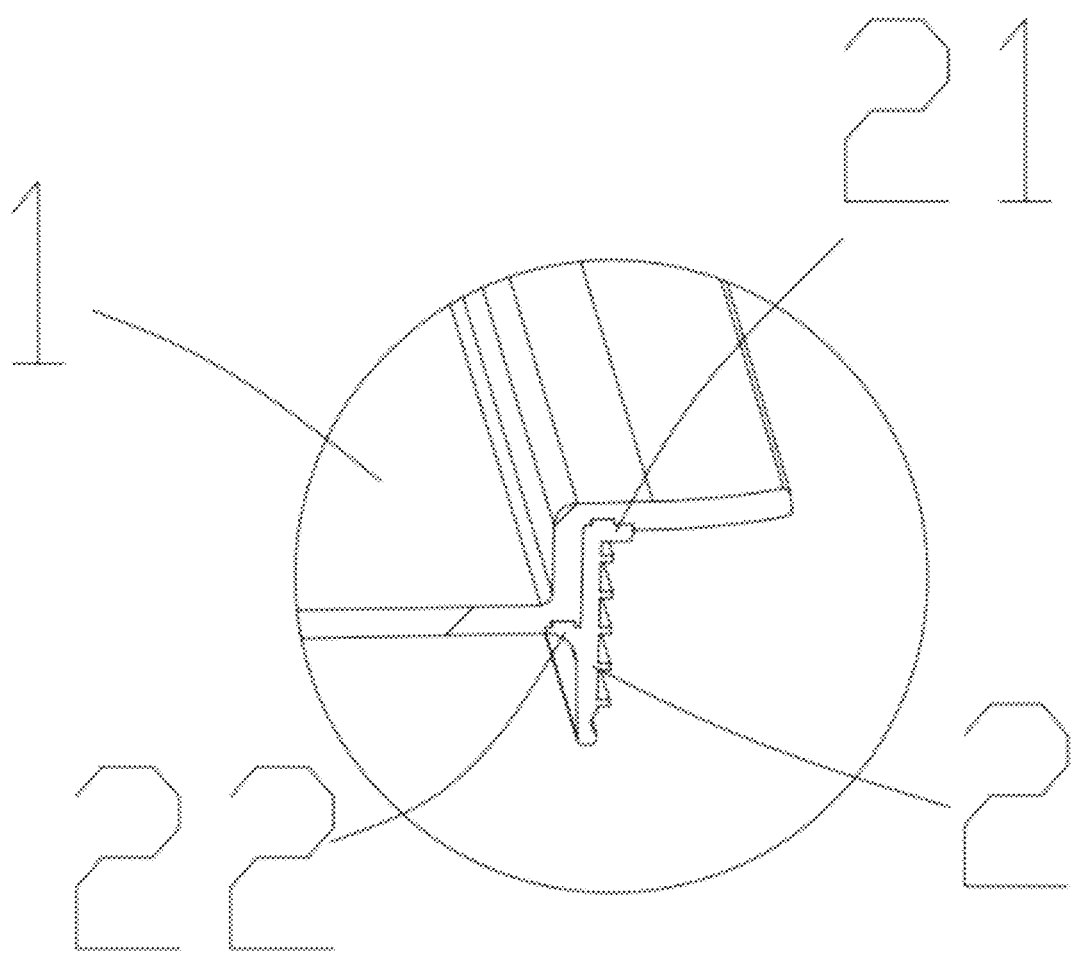
FIG. 15 is an enlarged view of part G in FIG. 14.

As shown in FIGS. 1-15, a sealing cover for GN pans includes a pan cover body 1 and a sealing ring 2, wherein the sealing ring 2 is arranged on the pan cover body 1, and surrounding edges of the pan cover body 1 extends outward to form a pan edge 11, a first clamping groove 12 is arranged at the pan edge 11, and a second clamping groove 13 is arranged at the pan cover body 1; an outer wall of the sealing ring 2 extends outward to form a first clamping edge 21, and an inner wall of the sealing ring 2 extends inward to form a second clamping edge 22, the first clamping edge 21 is embedded in the first clamping groove 12, and the second clamping edge 22 is embedded in the second clamping groove 13, so as to limit the movement of the sealing ring 2 from the pan cover body 1.

The present disclosure proposes a sealing cover for GN pans, wherein the first clamping edge 21 is embedded in the first clamping groove 12 and the second clamping edge 22 is embedded in the second clamping groove 13, so as to limit the movement of the sealing ring 2 from the pan cover body 1, the sealing ring 2 is ensured tightly connected with the pan cover body 1, and relative movement between the sealing ring 2 and the pan cover body 1 is avoided, so as to form an integrated structure of the sealing ring 2 and the pan cover body 1 and to ensure the sealing performance.

When the first clamping edge 21 is embedded in the first clamping groove 12 and the second clamping edge 22 is embedded in the second clamping groove 13, the left and right movement of the pan cover body 1, the front and back movement of the pan cover body 1, and the downward movement of the pan cover body 1 can be limited. Relative movement between the sealing ring 2 and the pan cover body 1 can be effectively avoided.

The sealing ring 2 includes an upper ring body 200, wherein a top of an outer wall of the upper ring body 200 extends outward to form the first clamping edge 21, and a bottom of an inner wall of the upper ring body 200 extends inward to form the second clamping edge 22.

In this embodiment, a recession 10 is formed at the pan cover body 1, and an upper end of the groove wall of the recession 10 extends outward to form the pan edge 11. The first clamping groove 12 is provided at the bottom of the pan edge 11, and the second clamping groove 13 is provided at the bottom of the pan cover body 1.

The sealing ring 2 also includes a lower ring body 201, which is formed by extending downward from a lower end of the upper ring body 200.

An embedding groove 23 is arranged at the inner wall of the upper ring body 200, and a protruding block 16 is arranged on an outer wall of the pan cover body 1, and the protruding block 16 is arranged in cooperation with the embedding groove 23.

In this embodiment, the embedding groove 23 is evenly arranged at circumferential intervals on the inner wall of the upper ring body 200.

The width L1 of the embedding groove 23 gradually increases from an end close to the pan cover body 1 to the other end away from the pan cover body 1. In this embodiment, a cross section of the embedding groove 23 in a horizontal direction is trapezoidal. And/or the width L1 of the embedding groove 23 gradually increases from bottom to top. In this embodiment, a cross section of the embedding groove 23 in a vertical direction is trapezoidal.

In this embodiment, the width L1 of the embedding groove 23 gradually increases from one end close to the pan cover body 1 to the other end away from the pan cover body 1 and the width of the embedding groove 23 gradually increases from bottom to top.

The width of the embedding groove 23 gradually increases from one end close to the pan cover body 1 to one end away from the pan cover body 1, and the width of the protruding block 16 gradually increases from one end close to the pan cover body 1 to the other end away from the pan cover body 1. The displacement of the sealing ring 2 from the pan cover body 1 can be limited.

The width L1 of the embedding groove 23 gradually increases from bottom to top, and the width of the protruding block gradually increases from bottom to top.

First mounting blocks 211 protrude from the first clamping edge 21, and first mounting slots 121 are recessed at a depression of the first clamping groove 12, and the first mounting block 211 is engaged with the first mounting groove 121; second mounting blocks 221 protrude the second clamping edge 22, and a second mounting groove 131 is arranged at a depression of the second clamping groove 13, and the second mounting block 221 is engaged with the second mounting groove 131.

In this embodiment, first mounting blocks 211 protrude upward at an upper end surface of the first clamping edge 21; second mounting blocks 221 protrude upward at an upper end surface of the second clamping edge 22.

In this embodiment, a cross section of the first mounting block 211 is circular; a cross section of the second mounting block 221 is circular.

An air pressure balance hole 14 is provided at the pan cover body 1, and a sealing nozzle 3 is also included. The sealing nozzle 3 and the sealing ring 2 are an integrated structure, and the sealing nozzle 3 is used to open or close the air pressure balance hole 14.

A perforation 15 is provided on the pan cover body 1, one end of the sealing nozzle 3 is connected to the sealing ring 2, and the other end passes through the perforation 15 and extends toward the air pressure balance hole 14. The sealing cover is used to seal GN pans. The air pressure in GN pans and the external air pressure can be balanced through the air pressure balance hole 14 by opening the sealing nozzle 3. When sealing is required, the air pressure balance hole 14 can be closed by closing the sealing nozzle 3.

When the sealing cover is pressed down on the GN pans to cover and seal the GN pans, since the air pressure in the GN pans needs to be discharged outward, the air pressure balance hole 14 can be opened by opening the sealing nozzle 3 so that the sealing cover can smoothly cover the GN pans.

When GN pans is covered by the sealing cover and placed in a refrigerator or a low-temperature environment for low-temperature storage, the air pressure in GN pans decreases. When GN pans need to be opened, it is difficult to separate the sealing cover from GN pans. At this time, by opening the sealing nozzle 3 to open the air pressure balance hole 14 to balance the air pressure in the GN pans with the external air pressure, so that the GN pans can be smoothly opened.

In this embodiment, a concave slot 100 is provided at the recession 10 of the pan cover body 1, and the other end of the sealing nozzle 3 passes through the perforation 15 and is arranged at the concave slot 100, and the air pressure balance hole 14 is arranged on the concave slot 100.

In this embodiment, a sealing nozzle body 31 of the sealing nozzle 3 is used to open or close the air pressure balance hole 14, the sealing nozzle extends forward, and a pull hole 32 is provided at an end portion of the sealing nozzle 3, and the pull hole 32 is used for a finger to pass, and pull the sealing nozzle 3 by the finger.

In this embodiment, the sealing ring 2 and the sealing nozzle 3 are made of TPE material.

A plurality of horizontal strips 202 are provided on the outer wall of the sealing ring 2, and the horizontal strips 202 are evenly arranged in the vertical direction. That is, the horizontal strips 202 are provided on the outer wall of the upper ring body 200 and an outer wall of the lower ring body 201 of the sealing ring 2.

The above preferred embodiments should be regarded as an example of the embodiments of the present disclosure scheme, and any technical deduction, replacement, improvement, etc. that is identical, similar, or based on the present application scheme should be regarded as the protection scope of the present disclosure.

What is claimed is:

1. A sealing cover for gastronorm pans, comprising: a pan cover body and a sealing ring, wherein the sealing ring is arranged on the pan cover body, and surrounding edges of the pan cover body extend outward to form a pan edge;

wherein a first clamping groove is arranged at the pan edge, and a second clamping groove is arranged at the pan cover body;

wherein an outer wall of the sealing ring extends outward to form a first clamping edge, and an inner wall of the sealing ring extends inward to form a second clamping edge;

wherein the first clamping edge is embedded in the first clamping groove, and the second clamping edge is embedded in the second clamping groove, so as to limit a movement of the sealing ring on the pan cover body;

wherein the sealing ring comprises an upper ring body, wherein a top of an outer wall of the upper ring body extends outward to form the first clamping edge, and a bottom of an inner wall of the upper ring body extends inward to form the second clamping edge;

wherein an embedding groove is arranged at the inner wall of the upper ring body, a protruding block is arranged on an outer wall of the pan cover body, and the protruding block is configured to match with the embedding groove;

wherein a width of the embedding groove gradually increases from an end close to the pan cover body to the other end away from the pan cover body, and/or the width of the embedding groove gradually increases from bottom to top.

2. The sealing cover for gastronorm pans according to claim 1, wherein the embedding grooves are evenly arranged at circumferential intervals on the inner wall of the upper ring body.

3. The sealing cover for gastronorm pans according to claim 1, wherein first mounting blocks protrude from the first clamping edge, first mounting grooves are recessed and formed at the first clamping groove, and first mounting blocks are engaged with first mounting grooves;

second mounting blocks protrude from the second clamping edge, second mounting grooves are recessed and formed at the second clamping groove, and second mounting blocks are engaged with second mounting grooves.

4. The sealing cover for gastronorm pans according to claim 1, wherein an air pressure balance hole is provided at the pan cover body, and a sealing nozzle is also included, the sealing nozzle and the sealing ring are an integrated structure, and the sealing nozzle is used for opening or closing the air pressure balance hole.

5. The sealing cover for gastronorm pans according to claim 4, wherein a perforation is provided on the pan cover body, one end of the sealing nozzle is connected to the sealing ring, and the other end passes through the perforation and extends toward the air pressure balance hole.

6. The sealing cover for gastronorm pans according to claim 1, wherein the sealing ring further comprises a lower ring body, which is formed by extending downward from a lower end of the upper ring body.

7. The sealing cover for gastronorm pans according to claim 1, wherein a plurality of horizontal strips are provided on the outer wall of the sealing ring, and the horizontal strips are evenly arranged in a vertical direction.

8. The sealing cover for gastronorm pans according to claim 1, wherein a cross section of the embedding groove in the vertical direction is trapezoidal.

9. The sealing cover for gastronorm pans according to claim 3, wherein a cross section of the first mounting block is circular; a cross section of the second mounting block is circular.

10. A sealing cover for gastronorm pans, comprising: a pan cover body and a sealing ring, wherein the sealing ring is arranged on the pan cover body, and surrounding edges of the pan cover body extend outward to form a pan edge;

wherein a first clamping groove is arranged at the pan edge, and a second clamping groove is arranged at the pan cover body;

wherein an outer wall of the sealing ring extends outward to form a first clamping edge, and an inner wall of the sealing ring extends inward to form a second clamping edge;

wherein the first clamping edge is embedded in the first clamping groove, and the second clamping edge is embedded in the second clamping groove, so as to limit a movement of the sealing ring on the pan cover body;

wherein an air pressure balance hole is provided at the pan cover body, and a sealing nozzle is also included, the sealing nozzle and the sealing ring are an integrated structure, and the sealing nozzle is used for opening or closing the air pressure balance hole;

wherein a concave slot is provided at a recession of the pan cover body, the other end of the sealing nozzle passes through the perforation and is arranged at the concave slot, and the air pressure balance hole is arranged on the concave slot.

11. A sealing cover for gastronorm pans, comprising: a pan cover body and a sealing ring, wherein the sealing ring is arranged on the pan cover body, and surrounding edges of the pan cover body extend outward to form a pan edge;

wherein a first clamping groove is arranged at the pan edge, and a second clamping groove is arranged at the pan cover body;

wherein an outer wall of the sealing ring extends outward to form a first clamping edge, and an inner wall of the sealing ring extends inward to form a second clamping edge;

wherein the first clamping edge is embedded in the first clamping groove, and the second clamping edge is embedded in the second clamping groove, so as to limit a movement of the sealing ring on the pan cover body;

wherein an air pressure balance hole is provided at the pan cover body, and a sealing nozzle is also included, the sealing nozzle and the sealing ring are an integrated structure, and the sealing nozzle is used for opening or closing the air pressure balance hole;

wherein a pull hole is provided at an end portion of the sealing nozzle.

* * * * *